(12) United States Patent
Brueckner et al.

(10) Patent No.: US 8,922,866 B2
(45) Date of Patent: Dec. 30, 2014

(54) OPTICS ARRANGEMENT AND METHOD FOR OPTICAL SAMPLING OF AN OBJECT PLANE COMPRISING A MULTI-CHANNEL IMAGING SYSTEM

(71) Applicant: Fraunhofer-Gesellschaft zur Foerderung der angewandten Forschung e.V., Munich (DE)

(72) Inventors: Andreas Brueckner, Jena (DE); Rene Berlich, Eisenberg (DE); Andreas Braeuer, Schloeben (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/969,457

(22) Filed: Aug. 16, 2013

(65) Prior Publication Data

US 2013/0335827 A1    Dec. 19, 2013

Related U.S. Application Data

(63) Continuation of application No. PCT/EP2013/051136, filed on Jan. 22, 2013.

(30) Foreign Application Priority Data

Jan. 23, 2012    (DE) .......................... 10 2012 200 903

(51) Int. Cl.
| | | |
|---|---|---|
| G02F 1/153 | (2006.01) | |
| F21V 8/00 | (2006.01) | |
| G02B 21/08 | (2006.01) | |
| G02B 3/00 | (2006.01) | |

(52) U.S. Cl.
CPC ............ G02B 3/0037 (2013.01); G02B 6/0055 (2013.01); G02B 6/0058 (2013.01); G02B 21/082 (2013.01)
USPC ........................................................ 359/267

(58) Field of Classification Search
USPC ........................................................ 359/267
See application file for complete search history.

(56) References Cited

U.S. PATENT DOCUMENTS

| | | |
|---|---|---|
| 2002/0114152 A1 | 8/2002 | Fujino |
| 2003/0223107 A1 | 12/2003 | Olszak et al. |
| 2011/0134040 A1* | 6/2011 | Duparre et al. ............... 345/166 |

FOREIGN PATENT DOCUMENTS

WO    WO2010/081652 A1    7/2010

* cited by examiner

*Primary Examiner* — James Jones
(74) *Attorney, Agent, or Firm* — Michael A. Glenn; Perkins Coie LLP

(57) ABSTRACT

An optics arrangement includes a multi-channel imaging system for optical sampling of an object plane in visual fields, abutting or overlapping in the object plane, of a plurality of optical channels of the multi-channel imaging system, and a waveguide arranged between the object plane and the multi-channel imaging system so as to guide light in the waveguide laterally, the waveguide having a plurality of redirecting structures arranged on a side of the waveguide facing the object plane and/or a side of the waveguide facing the multi-channel imaging system, the redirecting structures being arranged in dead zones between the visual fields of the optical channels, and the redirecting structures being configured to deflect the guided light in the direction of the object plane such that the object plane is illuminated.

23 Claims, 4 Drawing Sheets

OPTICS ARRANGEMENT AND METHOD FOR OPTICAL SAMPLING OF AN OBJECT PLANE COMPRISING A MULTI-CHANNEL IMAGING SYSTEM

CROSS-REFERENCE TO RELATED APPLICATIONS

This application is a continuation of copending International Application No. PCT/EP2013/051136, filed Jan. 22, 2013, which is incorporated herein by reference in its entirety, and additionally claims priority from German Application No. 102012200903.5, filed Jan. 23, 2012, which is also incorporated herein by reference in its entirety.

BACKGROUND OF THE INVENTION

Embodiments of the present invention relate to an optics arrangement and to a method for optical sampling of an object plane comprising a multi-channel imaging system.

Further embodiments of the present invention relate to an ultra-flat illumination module for multi-aperture imaging systems.

According to known technology, multi-aperture imaging systems or multi-channel imaging systems may be used for optical sampling of an object plane. A known multi-aperture imaging system, as is exemplarily described in DE 10 2009 047 361 A1, allows optical image recording of an extended object field at a high spatial resolution and an extremely short length with operating distances in the range of some millimeters. In addition, the arrangement allows magnifying the object field size considered, without an axial extension of the optical setup. This is done using an increased number of optical imaging channels.

However, due to the miniaturized implementation of this known multi-aperture imaging system and the short operating distances (distance between object and optics), illuminating the object field sufficiently is difficult in the case of incident light illumination (such as, for example, when considering non-transparent and non-luminous objects). In the case of lateral incident light illumination, the large lateral extension desired results in large angles of incidence of the illumination light and a highly inhomogeneous illumination situation. Confocal illumination, as is usual in microscopy, by the imaging lens cannot be implemented technically, or only with great expenditure and at the expense of the length, due to the miniaturization of the imaging system known.

Conventional flat illumination elements (such as, for example, arrangements for display backlighting by microstructured plates or films) are sufficiently thin, however they influence the optical path in the multi-aperture imaging optics and, consequently, cannot be used here.

Different ways of implementing direct light illumination are described in known technology. Known variations exemplarily base on a lightguide including different coupling-out mechanisms. The different coupling-out mechanisms exemplarily include coupling out by means of bumps or reflecting parts, coupling out by means of holograms or utilizing polarization effects.

Coupling-out by means of bumps or reflecting parts is, for example, described in U.S. Pat. No. 6,734,929 B2, U.S. Pat. No. 6,806,922 B2 and DE 102 44 444 A1. Coupling-out by means of bumps or reflecting parts in accordance with U.S. Pat. No. 6,734,929 B2 and U.S. Pat. No. 6,806,922 B2, however, is not suitable for (multi-aperture) imaging optics since illuminating elements in the optical path would impede imaging. Additionally, coupling-out by means of bumps or reflecting parts in accordance with DE 102 44 444 A1 is of disadvantage in that the bumps or reflecting parts are located directly in the optical imaging path close to the entrance pupil of a CCD camera. This results in a limitation to relatively large diameters of the entrance pupils (large optics). This is why the variation described in DE 102 44 444 A1 is not suitable for miniaturized imaging systems, such as, for example, multi-aperture imaging optics or micro-optics.

Coupling-out by means of holograms is, for example, described in U.S. Pat. No. 5,465,311, in U.S. Pat. No. 5,515,184 and in U.S. Pat. No. 6,429,913 B2. The disadvantage of this variation is that having holograms in the optical path would impede imaging. In addition, coupling-out by means of holograms in accordance with U.S. Pat. No. 5,465,311, U.S. Pat. No. 5,515,184 and U.S. Pat. No. 6,429,913 B2 is characterized by a marked dispersion behavior. This is why this variation is unsuitable for illuminating using spectral broad-band (white) light.

Making use of polarization effects is, for example, described in U.S. Pat. No. 6,750,996 B2 and in U.S. Pat. No. 7,027,671 B2. The disadvantage when utilizing polarization effects in accordance with U.S. Pat. No. 6,750,996 B2 and U.S. Pat. No. 7,027,671 B2 is that, with this variation, what results is a differing coupling-out efficiency for the regular and the irregular direction of polarization due to the difference in the index of refraction in birefringent media.

Conventional incident light illumination in microscopes by means of a beam splitter also represents known technology. Here, laterally incident illumination light is redirected by beam splitter cubes or cuboids. However, this conventional technology is not suitable for miniaturized imaging systems and objects distances of only a few millimeters, which at the same time have extended object fields of several square centimeters, since the thickness of the beam splitter is in scale with the area to be illuminated. This counteracts axial miniaturization.

A general problem is that, in known technology, there is no known concept which unites incident light illumination with multi-channel imaging of a close object field of lateral extensions, i.e. with a small distance of the object field to an optics arrangement, with a high image quality and a small structural height of the optics arrangement.

Consequently, it is the object of the present invention to provide a concept which allows incident light illumination for optical multi-channel imaging of a laterally extending close object field at a higher image quality and, at the same time, a smaller structural height of the optics arrangement.

SUMMARY

According to an embodiment, an optics arrangement may have: a multi-channel imaging system for optical sampling of an object plane comprising visual fields, abutting or overlapping in the object plane, of a plurality of optical channels of the multi-channel imaging system; and a waveguide arranged between the object plane and the multi-channel imaging system for guiding light laterally in the waveguide, wherein the waveguide comprises a plurality of redirecting structures arranged on a side of the waveguide facing the object plane and/or on a side of the waveguide facing the multi-channel imaging system, wherein the redirecting structures are arranged in dead zones between the visual fields of the optical channels, and wherein the redirecting structures are configured to deflect the guided light in the direction of the object plane such that the object plane is illuminated.

According to another embodiment, a method for optical sampling of an object plane comprising visual fields, abutting or overlapping in the object plane, of a plurality of optical channels of a multi-channel imaging system may have the steps of: laterally guiding light in a waveguide arranged between the object plane and the multi-channel imaging system, wherein the waveguide comprises a plurality of redirecting structures arranged on a side of the waveguide facing the object plane and/or on a side of the waveguide facing the multi-channel imaging system, wherein the redirecting structures are arranged in dead zones between the visual fields of the optical channels, and deflecting the guided light in the direction of the object plane using the redirecting structures such that the object plane is illuminated.

The central idea of the present invention is that the increased image quality mentioned above can be achieved with simultaneously implementing a reduced structural height of the optics arrangement when guiding light laterally in a waveguide arranged between the object plane and the multi-channel imaging system, when arranging the redirecting structures in dead zones between the visual fields of the optical channels and deflecting the guided light in the direction of the object plane using redirecting structures such that the object plane is illuminated. This, on the one hand, allows achieving a higher image quality or improved multi-channel imaging, while, on the other hand, at the same time realizing a reduced structural height of the optics arrangement. The light in the waveguide may be guided laterally and a special arrangement of the redirecting structures in dead zones between the visual fields of the optical channels may be employed.

In embodiments of the present invention, the redirecting structures may, on the side of the waveguide facing the multi-channel imaging system, comprise a plurality of micro-lenses which are convex in the direction of the multi-channel imaging system and provided with a reflecting layer. By means of this arrangement of the micro-lenses, the light guided in the waveguide can be coupled out efficiently in the direction of the object plane. This allows illuminating the object plane with a comparably high illuminating efficiency.

BRIEF DESCRIPTION OF THE DRAWINGS

Embodiments of the present invention will be detailed subsequently referring to the appended drawings in which same element or elements having the same effect are provided with same reference numerals, in which.

DETAILED DESCRIPTION OF THE INVENTION

Figure 1:
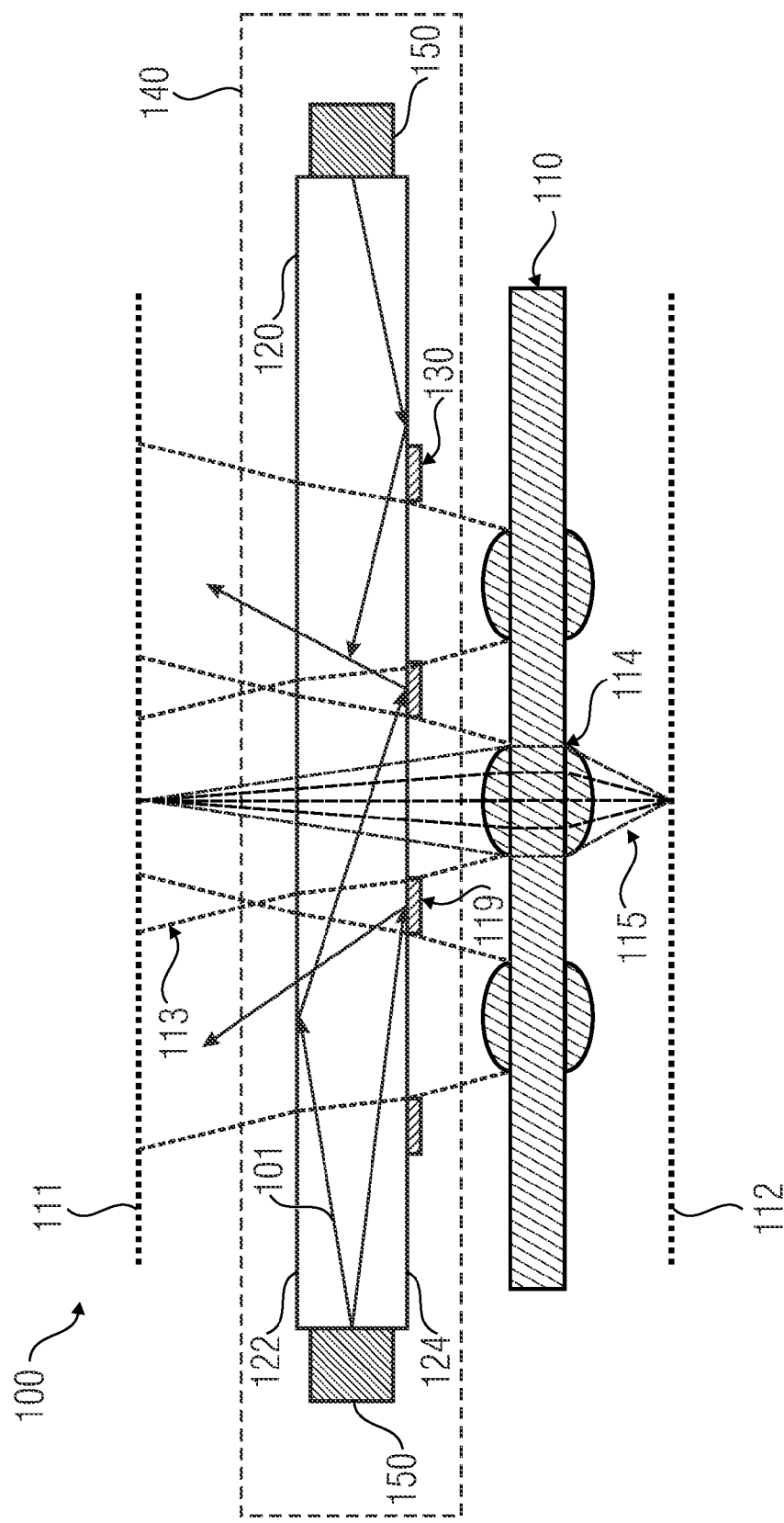
FIG. 1 shows a lateral view of an optics arrangement in accordance with an embodiment of the present invention.

Before discussing the present invention in detail below referring to the figures, it is pointed out that in the embodiments illustrated below same elements or functionally equal elements are provided with the same reference numerals in the figures. A description of elements of equal reference numerals consequently is mutually exchangeable and/or mutually applicable in the different embodiments.

FIG. 1 shows a lateral view of an optics arrangement 100 in accordance with an embodiment of the present invention. In the embodiment shown in FIG. 1, the optics arrangement 100 comprises a multi-channel imaging system 110 and a waveguide 120 comprising a plurality of deflecting structures 130. The multi-channel imaging system 110 of the optics arrangement 100 is configured to perform optical sampling of an object plane 111 in visual fields 113, abutting or overlapping in the object plane 111, of a plurality of optical channels 115 of the multi-channel imaging system 110. Additionally, the waveguide 120 of the optics arrangement 100 is arranged between the object plane 111 and the multi-channel imaging system 110 so as to laterally guide light 101 in the waveguide 120. As is shown in FIG. 1, the waveguide 120 comprises a plurality of redirecting structures 130. The redirecting structures 130 may be arranged on a side 122 of the waveguide 120 facing the object plane 111 and/or on a side 124 of the waveguide 120 facing the multi-channel imaging system 110.

In the embodiment shown in FIG. 1, the redirecting structures 110 are arranged in dead zones 119 between the visual fields 113 of the optical channels 115. Additionally, the redirecting structures 130 are configured to deflect the guided light 101 in the direction of the object plane 111 so that the object plane 111 is illuminated.

A lateral direction is defined as a direction which is essentially parallel to a surface (side 122 or 124) of the waveguide 120.

In further embodiments, the optics arrangement 100 may additionally comprise one or several light sources 150 which are arranged laterally next to the waveguide 120. The one or several light sources 150 here is/are configured to laterally couple in light 101 into the waveguide 120.

In the side view of FIG. 1, light sources 150 of this kind are illustrated exemplarily. The light sources 150, together with the waveguide 120 and the redirecting structures 130, form an illumination module 140. The illumination module 140 of the optics arrangement 100 is indicated in FIG. 1 by a broken line.

In embodiments, the multi-channel imaging system 110, for each optical channel 115, comprises optics 114 comprising a field aperture which determines the visual field 113 of the respective channel 115.

In embodiments in accordance with FIG. 1, the optics 114 of each individual channel 115 of the multi-channel imaging system 110 may comprise an intermediate image plane where an aperture (field aperture) is arranged. The field aperture of the respective optics 114 may exemplarily be defined by the aperture arranged in the intermediate image plane. As is indicated in FIG. 1, the respective optics 114 may be a lens system which exemplarily is symmetrical relative to the intermediate image plane. Here, lenses of the symmetrical lens system may exemplarily be identical and exhibit equal modes of operation.

In embodiments, the multi-channel imaging system 110 is configured to image the object plane 111 onto an image plane 112 via the plurality of optical channel 115 so that a fill factor between 90 and 100% will result in the image plane 112. Multi-channel imaging is realized by imaging the object plane onto the image plane or an image sensor via several optical channels. The multi-channel imaging may exemplarily be one-to-one imaging, channel after channel, of sub-areas of the object plane onto the image plane. The one-to-one imaging, channel after channel, may exemplarily be obtained by a symmetrical arrangement of each individual optical channel. In addition, a different imaging scale for the multi-channel imaging may also be obtained by a different arrangement of the respective optical channels.

In the multi-channel imaging in accordance with the embodiment of FIG. 1, the redirecting structures 130 are arranged in a plane which is located between the image plane 112 and the object plane 111. The visual fields 113 of the optical channels 115 do not overlap in the plane where the redirecting structures 130 are arranged.

In embodiments, the optical channels of the multi-channel imaging system each include optics comprising a field aperture or individual-channel imaging system for imaging a sub-region of the object plane onto the image plane or an image sensor in one of the visual fields of the respective channel abutting or overlapping in the object plane (multi-aperture imaging system). A single optical channel here is defined by an optical path when imaging by the respective optics or individual imaging system between the object plane and the image plane. In embodiments, each sub-region of the object plane may be imaged via an associated optical channel of the multi-channel imaging system (optical sampling). The visual fields of the individual optical channels are exemplarily illustrated by dotted lines 113 in FIG. 1.

In further embodiments, the redirecting structures 130 are implemented to be on the side 124 of the waveguide 120 facing the multi-channel imaging system 110 so as to scatter or reflect the guided light 101 in the direction of the object plane 111. By means of scattering or reflecting the light guided in the waveguide in the direction of the object plane, light can be coupled out of the waveguide to illuminate the object plane. This is achieved by the light scattered or reflected at the redirecting structures 130 (on the side 124 of the waveguide 120) impinging on the side 122 of the waveguide 120 facing the object plane 111 at such an angle which is smaller than or equal to the critical angle of total reflection on this side or interface.

Furthermore, in further embodiments, redirecting structures may be arranged on the side 122 of the waveguide 120 in dead zones 119 between the visual fields 113 of the optical channels 115 (not shown in FIG. 1). The redirecting structures on the side 122 of the waveguide 120 may exemplarily be coupling-out structures comprising a surface curved in the direction of the object plane 111, which is how an angle at which light 101 from the waveguide 120 impinges on the surface of the coupling-out structure may be reduced (angle smaller than or equal to a critical angle of total reflection) such that the light 101 guided in the waveguide 120 is coupled out at the coupling-out structures in the direction of the object plane 111.

The light may also be guided laterally in the waveguide 120 by means of total reflection at the side 122 of the waveguide 120 facing the object plane 111 and the side 124 of the waveguide 120 facing the multi-channel imaging system 110. Here, total reflection at the sides 122, 124 or the interfaces of the waveguide 120 will occur only at such sections of the interfaces where there are no redirecting structures and/or coupling-out structures.

Referring to FIG. 1, an optics arrangement 100 comprising a multi-channel imaging system 110 for optical sampling of an object plane 111 is realized. As is shown in FIG. 1, the illumination module 140 is placed separate from the multi-aperture imaging system or multi-channel imaging system 110 and may thus be employed optionally, depending on the case of application. The illumination module here is to be adjusted in a lateral plane which is essentially parallel to a surface of the waveguide 120, relative to a channel pattern of the multi-aperture imaging optics or multi-channel imaging system 110. Here, the channel pattern is exemplarily defined by a plurality of optical axes of the channels of the multi-channel imaging system.

The light sources 150 (such as, e.g., light emitting diodes, LEDs) emit light 101 into the waveguide 120 which may exemplarily be an optical waveguide plate (such as, e.g., a glass substrate) wherein the light 101 or the rays are guided by total reflection and may propagate in the entire waveguide 120 or in the entire optical waveguide plate. On the image side (or also the object side), redirecting structures 130, such as, for example, microstructures, the lateral overall extension of which may be adjusted to the object region to be illuminated in the object plane may be applied over the entire area onto the optical waveguide. At the positions of the redirecting structures 130 or microstructures, the guided rays 101 may be deflected using the redirecting structures or microstructures. The redirecting structures 130 or microstructures thus allow light to be coupled out of the optical waveguide 120.

In embodiments, the redirecting structures 130 or microstructures are positioned such that they are located outside the visual fields 113 of the individual channels 115 of the multi-aperture imaging system or multi-channel imaging system 110 (making use of the dead zones 119), such that imaging is not impeded.

In the optics arrangement shown in FIG. 1, on the one hand, efficient illumination of the object plane can be achieved by using the waveguide comprising the plurality of redirecting structures. On the other hand, impairment of the multi-channel imaging via the several optical channels can be avoided by specially arranging the redirecting structures in dead zones between the visual fields of the optical channels. This allows increasing image quality and improving multi-channel imaging. This results, above all, from the fact that the redirecting structures are located in the dead zones, and not in the optical path of the respective channels between the object plane and the image plane.

In the schematic side view of FIG. 1, using a comparatively thin illumination module 140 in connection with a multi-aperture imaging system or multi-channel imaging system 110 which images the object plane 111 onto the image plane (or image sensor) 112 is shown. The illumination module 140 here ensures incident light illumination onto the object plane 111 by guiding the light 101 emitted from the laterally attached light sources 150 within a waveguide 120 or optical waveguide plate and coupling same out in the direction of the object plane 111 by the locally implemented redirecting structures 130 or microstructures. The illumination module 140 here is placed relative to the multi-aperture imaging system 110 such that the coupling-out microstructures are located outside the visual fields of the individual channels 115 of the multi-aperture imaging system 110. This is of advantage in that the imaging optical path ideally is not influenced by the illumination unit or illumination module. This allows increasing image quality with multi-channel imaging using several optical channels.

Figure 2:
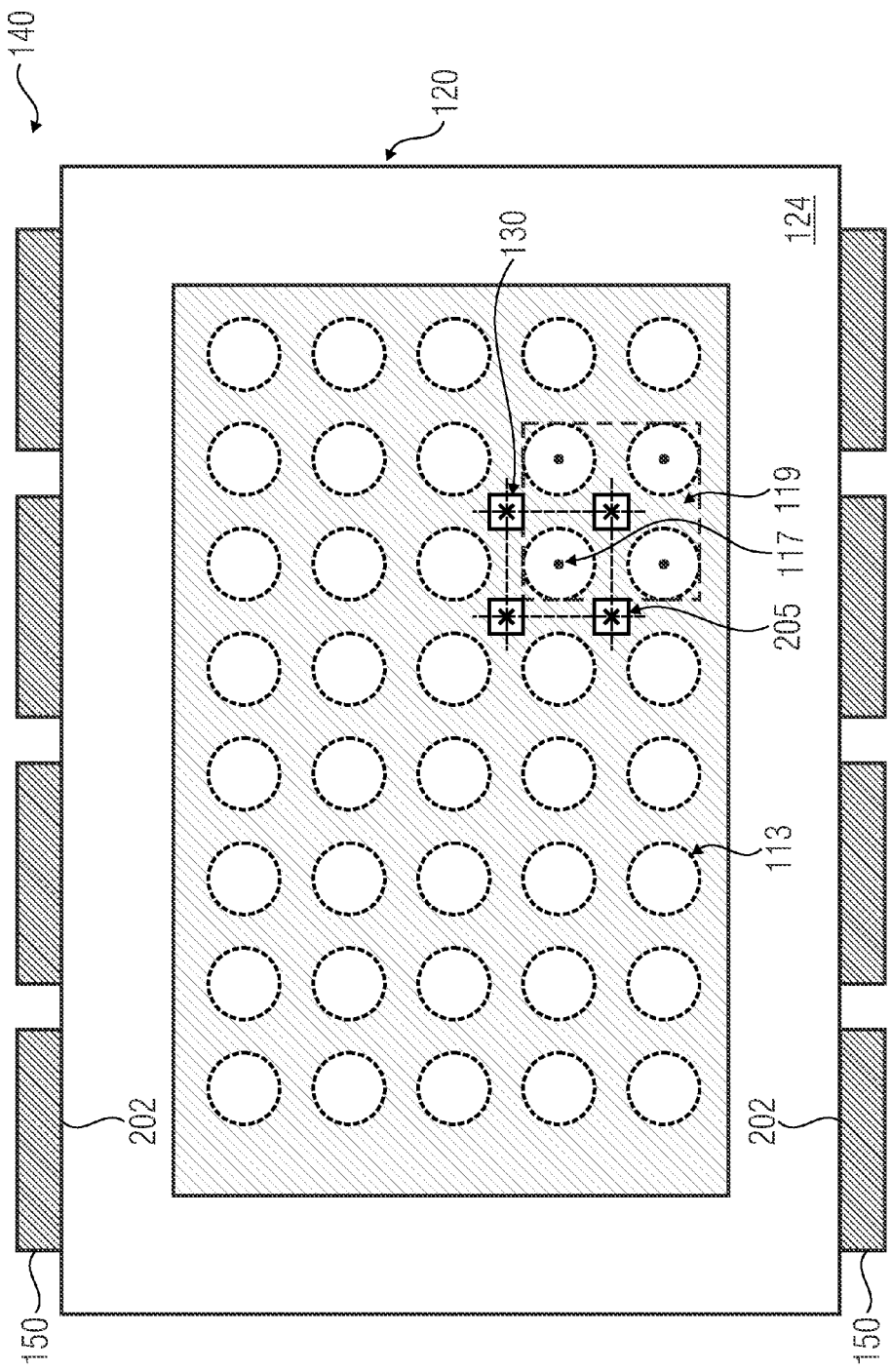
FIG. 2 shows a front view of an embodiment of a waveguide for illustrating dead zones between visual fields of several optical channels.

FIG. 2 shows a front view of an embodiment of a waveguide 120 for illustrating dead zones between visual fields of several optical channels. The embodiment of the waveguide 120 shown in FIG. 2 may be part of the illumination module 140 shown in FIG. 1. In the front view of FIG. 2, what may be seen is the side 124 of the waveguide 120 facing the multi-channel imaging system 110. In embodiments in accordance with FIGS. 1 and 2, the channels 115 of the multi-channel imaging system 110 are distributed in two dimensions and the waveguide 120 is implemented as an optical waveguide plate. In the front view of FIG. 2, the dead zones 119 between the visual fields 113 of the optical channels distributed in two dimensions can be made out clearly. As is shown in FIG. 2, the dead zones 119 extend between the visual fields 113 in a plane which is essentially parallel to a surface of the optical waveguide plate. The region where the dead zones 119 extend between the visual fields 113 is illustrated in the front view of FIG. 2 by a hatched area. In addition, the redirecting structures 130 which are arranged on the side 124 of the waveguide 120 facing the multi-channel imaging system 110 are shown in the front view of FIG. 2.

In embodiments, the optical waveguide plate 120 exhibits a rectangular shape, wherein the optics arrangement additionally comprises one or several light sources 150 which are arranged laterally next to the rectangularly-shaped optical waveguide plate 120 (see FIG. 2). The one or several light sources 150 here may be configured to couple light from a longer side 202 of the rectangularly-shaped optical waveguide plate 120 into same. By means of coupling in light from the longer side 202 of the rectangularly-shaped optical waveguide plate 120, losses caused by total reflection which may occur when laterally guiding the light in the optical waveguide plate 120 to a central region can be reduced since the distance from the longer side 202 of the rectangularly-shaped optical waveguide plate 120 to the central region thereof is comparatively small. Thus, a sufficient amount of light for illuminating the object plane may be provided in the central region of the optical waveguide plate 120.

Thus, FIG. 2 shows a schematic front view of the comparatively thin illumination module 140 comprising the optical waveguide plate 120 and light sources 150 attached at least at a front end (such as, e.g., the longer side 202 of the rectangularly-shaped optical waveguide plate 120). The locally implemented redirecting structures 130 or microstructures are located in zones (dead zones) outside the visual fields 113 of the individual channels of the multi-aperture imaging system (or multi-channel imaging system). In embodiments, the lateral overall extension of the redirecting structures or microstructures is adjusted to the object region to be illuminated. Thus, optimum illumination of the object plane 111 may be achieved.

Figure 3:
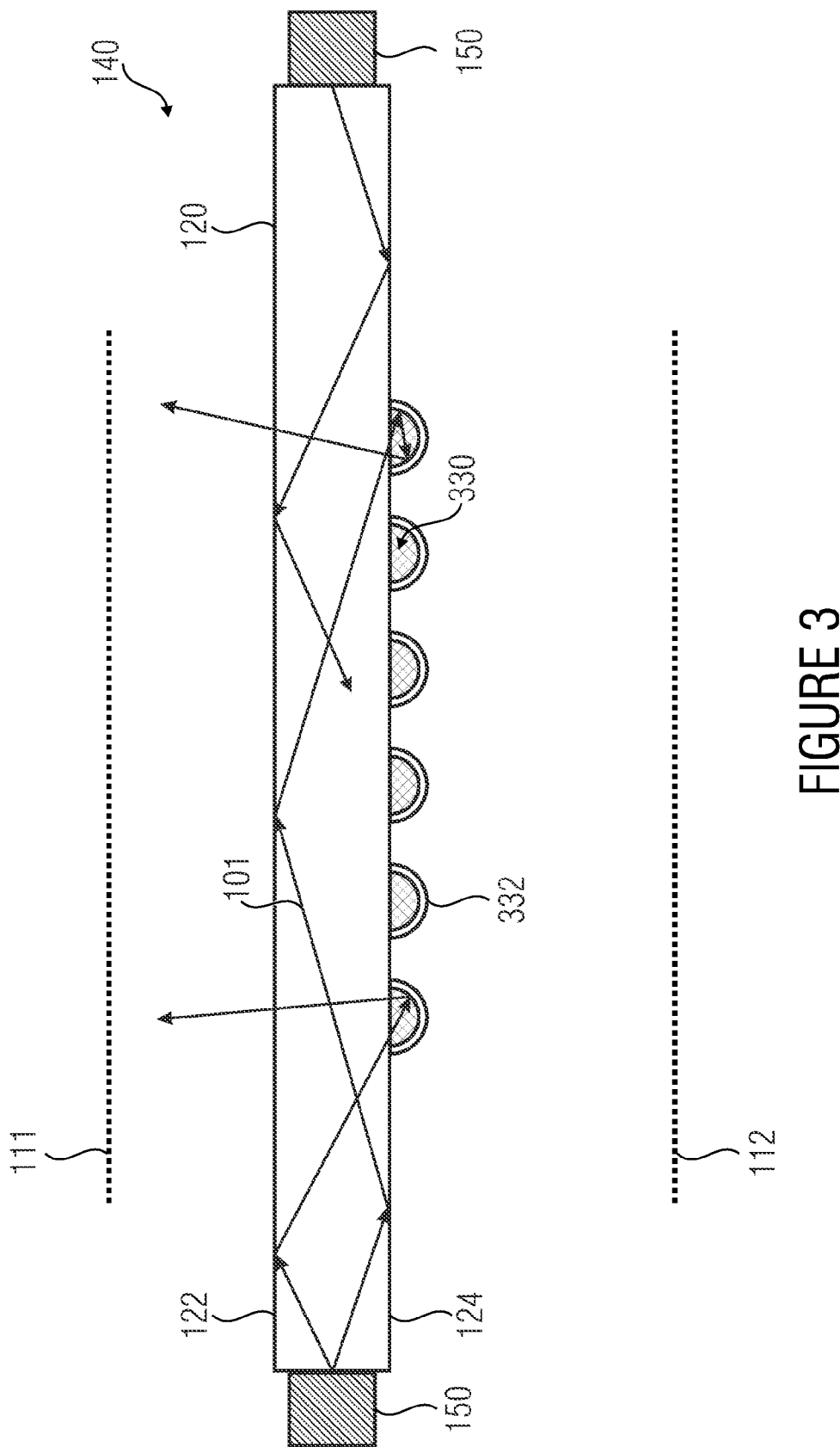
FIG. 3 shows a lateral view of another embodiment of a waveguide comprising a plurality of micro-lenses.

FIG. 3 shows a side view of another embodiment of a waveguide 120 comprising a plurality of microlenses 330. The waveguide 120, shown in FIG. 3, including the light sources 150 essentially corresponds to the illumination module 140 shown in FIG. 1. In the embodiment shown in FIG. 3, the redirecting structures comprise, on the side 124 of the waveguide 120 facing the multi-channel imaging system 110, a plurality of microlenses 330 which are curved in the direction of the multi-channel imaging system 110 and are provided with a reflecting layer 332. The multi-channel imaging system in the direction of which the microlenses 330 are curved and which is located between the image plane 112 and the waveguide 120 is not shown in FIG. 3. In embodiments in accordance with FIG. 3, the microlenses 330 provided with the reflecting layer 332 are configured to reflect the light 101 guided in the waveguide 120 with the least losses possible and deflect same such that it will be coupled out of the waveguide 120. In this way, the object plane 111 may be illuminated at a comparably high illumination efficiency.

What is shown in the schematic side view of FIG. 3 is an embodiment of the thin illumination module 140 comprising the optical waveguide plate 120 and light sources 150 applied at least at a front end of the optical waveguide plate. The locally implemented redirecting structures 130 or microstructures may be formed by microlenses 330 which, in the case of being positioned on the side of the optical waveguide 120 facing away from the object (side 124), comprise an additional mirror layer (such as, e.g., metal layer) or reflecting layer 332. Due to this arrangement, the light 101 guided within the waveguide 120 or optical waveguide plate may be coupled out in the direction of the object plane 111, for the purpose of efficient object illumination.

Figure 4:
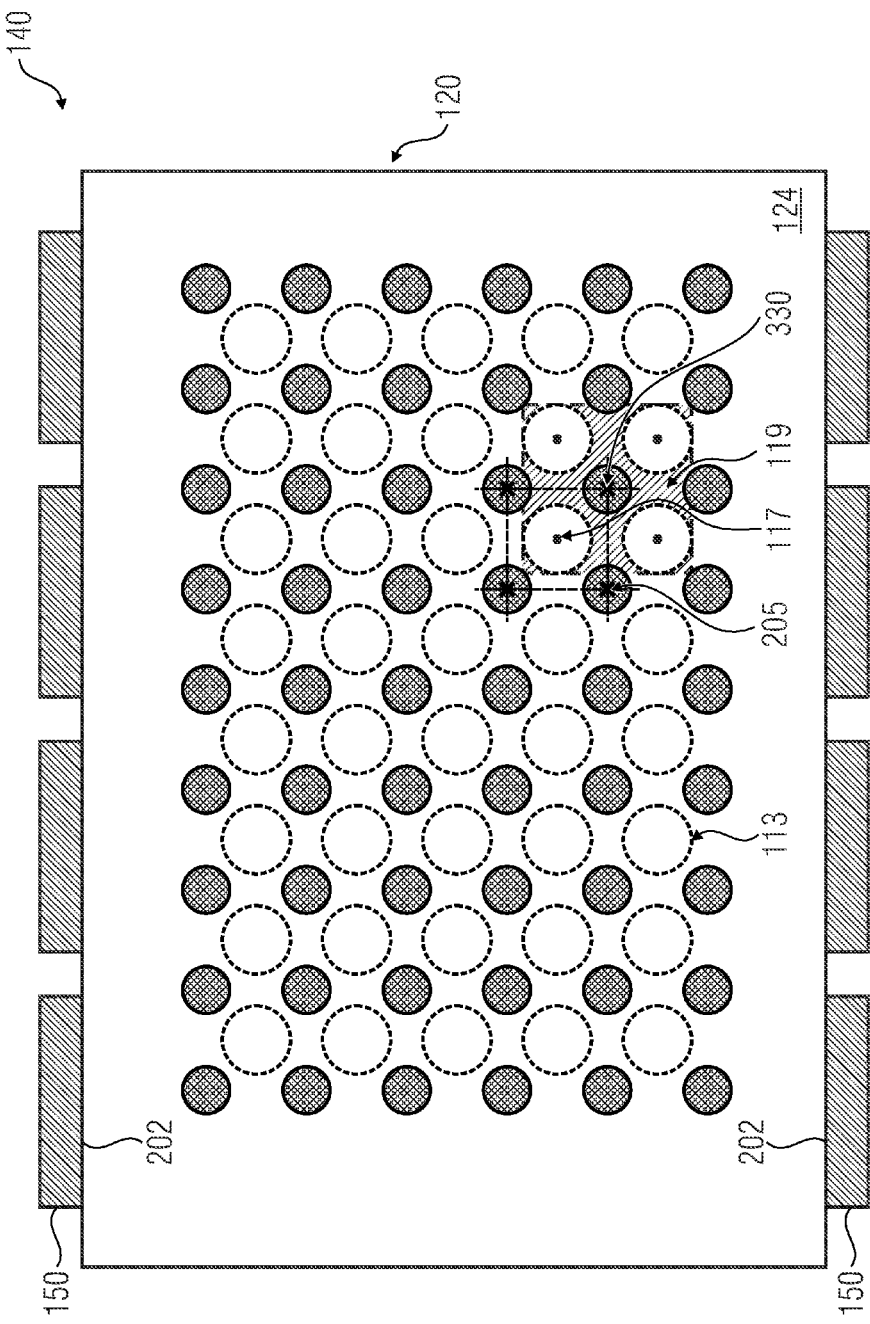
FIG. 4 shows a front view of the embodiment of the waveguide in accordance with FIG. 3.

FIG. 4 shows a front view of the embodiment of the waveguide 120 in accordance with FIG. 3. What is to be recognized in the front view of FIG. 4 is the side 124 of the waveguide 120 facing the multi-channel imaging system 110. The embodiment of the waveguide 120 shown in FIG. 4 may be part of the illumination module 140 shown in FIG. 1. In addition, the visual fields 113 of the optical channels including the dead zones 119 there between are exemplarily illustrated in FIG. 4. In the embodiments in accordance with FIG. 4, the respective microlenses 330 are arranged in the dead zones 119 located outside the visual fields 113.

FIG. 4 thus illustrates a schematic front view of an embodiment of the thin illumination module 140 comprising the optical waveguide plate 120 and light sources 150 applied at least at a front end of the optical waveguide plate 120. The locally implemented redirecting structures 130 or microstructures here may be formed by microlenses 330 which, in the case of an exemplary Cartesian arrangement of the optical channels of the multi-aperture imaging system or multi-channel imaging system 110 and, consequently, also a Cartesian distribution of the visual fields 113 of the imaging channels (or optical channels), may also be arranged, in an exemplary Cartesian pattern, in the gaps of the visual fields 113 or dead zones 119.

In embodiments, the redirecting structures 130 or microlenses 330 are arranged on the side 124 of the waveguide 120, facing the multi-channel imaging system 110, at grating positions of a grating 205 (see FIGS. 2 and 4). With regard to FIG. 1, the multi-channel imaging system 110 comprises optics 114 for each channel 115. In embodiments, optical axes 117 of the channels 115 may be arranged at intermediate grating positions of the grating 205. This is exemplarily shown in FIGS. 2 and 4. A particularly homogeneous illumination of the object plane may be achieved by the symmetrical arrangement of the optical axes 117 of the channels 115 at the intermediate grating positions of the grating 205.

In embodiments, the grating 205 may be a regular Cartesian or hexagonal grating.

In embodiments, a density at which optical axes 117 of the optical channels 115 of the multi-channel imaging system 110 are distributed laterally, is constant (exemplarily see FIGS. 2 and 4).

In addition, in embodiments in accordance with FIGS. 2 and 4, the visual fields 113 of all the channels 115 are equal.

In further embodiments, the redirecting structures 130 comprise a plurality of adaptive microlenses 330 on the side 124 of the waveguide 120 facing the multi-channel imaging system 110 (see, e.g., FIG. 3). Here, the adaptive microlenses 330 may be configured to vary over time coupling-out efficiency of the light 101 guided in the waveguide 120 in the direction of the object plane 111. The adaptive microlenses may exemplarily be controlled such that the surface profile thereof changes over time. By varying over time the surface profile and, thus, coupling-out efficiency of the guided light out of the waveguide, the illumination intensity for illuminating the object plane may be adjusted in time.

In further embodiments, the waveguide 120 comprises an anti-reflection layer arranged on the side 122 of the waveguide 120 facing the object plane 111. Thus, reflections back into the visual fields 113 of the optical channels 115 can be prevented, thereby further increasing image quality. Reflection of incoming light which exemplarily forms with diffused scattering at the object plane can be avoided by providing the anti-reflection layer on the side 122 of the waveguide 120.

In embodiments, the optics arrangement 100 additionally comprises one or several light sources 150 and associated optical filters. Exemplarily, the one or several light sources 150 is/are configured to provide light 101 of a spectral input bandwidth for being coupled into the waveguide 120. Additionally, the optical filters may be configured to modify the spectral input bandwidth of the light 101 provided by the one or several light sources 150. The optics arrangement 100 here is configured to acquire light 101 deflected in the direction of the object plane 111 at a modified spectral output bandwidth for illuminating the object plane 111.

In further embodiments, the optics arrangement 100 comprises the one or several light sources 150. Exemplarily, the one or several light sources 150 is/are configured to provide light 101 of a spectral input bandwidth for being coupled into the waveguide 120. In addition, the waveguide 120 may be configured to modify the spectral input bandwidth of the light 101 provided by the one or several light sources 150. The optics arrangement 100 here is configured to acquire the light 101 deflected in the direction of the object plane 111 at a modified spectral output bandwidth for illuminating the object plane 111.

In further embodiments, the modified spectral output bandwidth is smaller than the spectral input bandwidth.

Thus, the spectral characteristic may be modified for illuminating the object plane. The optical filters may exemplarily be used to limit the spectral bandwidth of the illumination light. Exemplarily, the optical filters may be connected downstream of the one or several light sources. For limiting the spectral bandwidth of the illumination light by the optical filters, light may exemplarily be coupled in perpendicularly to the waveguide implemented as an optical waveguide plate. With perpendicular coupling-in of light into the waveguide, a deflecting structure may exemplarily be used which deflects the perpendicularly incident light of the one or several light sources such that same is coupled laterally into the optical waveguide plate or waveguide and guided laterally. Additionally, modification of the illumination light may be caused by combination with additional beam-forming micro-optics (such as, e.g. microlens) connected downstream of the one or several light sources.

In addition, the waveguide or optical waveguide plate or optical guide substrate may represent a spectral volume filter glass (exemplarily without using additional optical filters). Using the optical guide substrate as, for example, a spectral volume filter glass allows illuminating the object plane exclusively in a finite spectral range (such as, e.g., band-pass range of the filter glass) and absorbing a complementary spectral range (such as, e.g., absorption range of the filter glass). Thus, the spectral characteristic of the illumination of the object plane can be modified suitably.

In embodiments, between neighboring redirecting structures 130, a parameter thereof may change laterally, said parameter describing a characteristic of the surface profile.

In embodiments, this parameter (such as, e.g., radius of curvature or the surface profile of a microlens being conical) may be changed laterally such that coupling-out efficiency of redirecting structures or microlenses located close to a light coupling-in region or edge regions of the waveguide or optical waveguide plate is small compared to coupling-out efficiency of redirecting structures or microlenses located in a central region of the waveguide or optical waveguide plate. Due to a higher coupling-out efficiency of the redirecting structures or microlenses in a central region of the waveguide or optical waveguide plate, losses of total reflection forming when laterally guiding light from the light coupling-in region to the central region of the waveguide or optical waveguide plate may be compensated such that an essentially homogeneous illumination can be achieved in the object plane.

In an embodiment having mirrored microlenses (i.e. provided with a reflecting layer) on the image side (side 124) of the waveguide 120, coupling-out efficiency may be increased, exemplarily by reducing the radius of curvature when, exemplarily, maintaining an equal area of the microlenses. With a constant radius of curvature, a maximum coupling-out efficiency can also be obtained with a certain (negative) conical value. Conical values around said local maximum result in an increasing reduction in coupling-out efficiency.

In addition, in further embodiments, an area occupancy of the redirecting structures 130 on the waveguide 120 may change laterally. With regard to FIGS. 2 and 4, the area occupancy is exemplarily defined locally by occupying the area of a respective dead zone 119 by the redirecting structures 130 or microlenses 330. Exemplarily, the area occupancy of the redirecting structures or microlenses in a central region of the waveguide or optical waveguide plate may be greater than in edge regions of the waveguide or optical waveguide plate (light coupling-in region), wherein the light coupling-in region is closer to the laterally applied light sources. Due to a higher area occupancy in the central region of the waveguide or optical waveguide plate, the result is basically higher coupling-out efficiency in the central region, so that losses of total reflection in turn may be compensated with lateral light guiding in the waveguide from the light coupling-in region to the central region of the waveguide or optical waveguide plate. This is of advantage in that homogeneous illumination on the object plane can be achieved.

In further embodiments, a shape of the redirecting structures 130 or the number of redirecting structures 130 per area of dead zones 119 where the redirecting structures 130 are arranged may change laterally on the waveguide 120. The optics arrangement 100 here is exemplarily configured to obtain a predetermined spatial distribution of the light 101 in the object plane 111, deflected in the direction of the object plane 111. Thus, in embodiments, the spatial characteristic of the light distribution on the object area (or in the object plane) may be modified.

Adjusting the shape of the microstructures or redirecting structures exemplarily takes place by changing laterally the radius or curvature, the conical value or polynomial coefficients of a free-form surface description thereof on the waveguide. By laterally changing the shape of the redirecting structures on the waveguide, what may be achieved is optimizing efficiency and/or illumination intensity and/or illumination intensity distribution on the object area or in the object plane. In addition, on the one hand, the best possible homogeneity and, on the other hand, specific inhomogeneity of the illumination intensity on the object area or in the object plane may be achieved by laterally changing the number of redirecting structures per area of dead zones or by adjusting the number density of microstructures (variation of the number of structural elements or redirecting structures per area interval or dead zone). Specifically generating inhomogeneity of the illumination intensity on the object area may exemplarily be used to allow only selected regions of the object area to be illuminated.

In further embodiments, the waveguide 120 comprises a plurality of apertures associated to the redirecting structures 130 arranged in the dead zones 119. Exemplarily, the apertures each comprise an aperture opening configured to vary the transmission of light 101 deflected in the direction of the object plane 111 so as to set an angular distribution of the light 101 deflected in the direction of the object plane 111.

In further embodiments, a structural design of the redirecting structures 130 on the waveguide 120 changes laterally and/or in the direction of the object plane 111. Exemplarily, the redirecting structures 130 are configured to obtain a predetermined angular distribution of the light 101 deflected in the direction of the object plane 111.

Thus, the angle-dependent characteristic of the illumination light may be modified. This is exemplarily realized by combining the redirecting structures (microstructures) with varying zonal apertures or varying apertures located above the unit cell (dead zone) of a respective redirecting structure (i.e. apertures, the respective aperture opening of which may be varied) so as to set or influence the angular radiating characteristic or angular distribution of the light deflected in the direction of the object plane. Providing apertures associated to the redirecting structures arranged in the dead zones exemplarily serves for dark field illumination or preventing direct reflections on the object plane. The respective aperture openings of the apertures may exemplarily be set such that small angles of arrival of the illumination light relative to the normal of the object plane are avoided. This may exemplarily be done by using ring-shaped apertures mirrored on one side. The mirrored surfaces of the apertures are exemplarily facing the multi-channel imaging system 110.

Different redirecting structures may exemplarily be arranged on the side 124 of the waveguide facing the multi-channel imaging system and the side 122 of the waveguide facing the object plane so as to change the structural implementation of the redirecting structures in the direction of the object plane.

Additionally, a combination of different redirecting structures (microstructures), which may be done both laterally and axially (i.e. the structural implementation of the redirecting structures on the waveguide changes laterally and/or in the direction of the object plane) may be used for achieving, when combining the effects of all the structures, a special angular radiation behavior.

The combination of the different redirecting structures exemplarily includes combining microstructures having roughened areas or statistical scattering structures.

In further embodiments, the optics arrangement 100 additionally comprises a motor device configured to move the multi-channel imaging system 110 in the direction of the object plane 111 and in the direction of the image plane 112 in a controlled manner. The motor device exemplarily is configured such that an imaging scale of the optical channels 115 essentially is maintained when moving the multi-channel imaging system 110 between the object plane 111 and the image plane 112.

Thus, embodiments also include a light source which is mounted laterally at at least a front end of an optical waveguide plate and is implemented to be as small as possible, an optical waveguide plate and redirecting structures or microstructures locally implemented on one or both sides of the optical waveguide plate for homogeneously (or, in a controlled manner, inhomogeneously) illuminating the object field or object plane.

The light sources coupling in laterally may exemplarily be LED light sources, OLED (organic light emitting diode) light sources, CCFL (cold cathode fluorescent lamp) light tubes (such as, e.g., cold cathode tubes, gas-discharge tubes) or other small light sources.

In addition, the light sources may exemplarily include a plurality of point-shaped light sources or be formed by emitting areas (such as, e.g., variable-shape beam radiators) with the largest extension possible along the longer side of the rectangularly-shaped optical waveguide plate or the long dimension of the optical waveguide plate.

In embodiments, the angular radiating characteristic of the light sources may be adjusted such that same takes place in the largest angular region possible (such as, e.g., Lambertian radiating characteristic) so as to obtain homogeneous illumination of the entire object area.

It is in particular to be mentioned here that the angular radiation in the lateral plane is best to correspond to a Lambertian distribution (radiation density in all directions within the angular range from −90° to 90°), whereas the angular radiation in the plane perpendicular thereto is only to be within the angular region of total reflection in the optical waveguide. This also means optimum coupling in of light into the optical waveguide.

In further embodiments, the angular radiating characteristic of the light sources, however, may be generated by light sources of strongly limited angular radiation characteristics to thereby achieve a direction-dependent illumination of the object area or object plane.

In addition, different spectral characteristics of the illumination light or light sources may be provided. Exemplarily, spectral broad-band light (such as, e.g., white light), spectral narrow-band light (such as, e.g., one-colored illumination) or a combination of small-band light emissions (such as, e.g., combination of the illumination colors red, green, blue; controllable in their intensity individually) may be used.

In embodiments, the optical waveguide plate may comprise a material of an index of refraction which is higher compared to its surroundings (such as, e.g., air). The optical waveguide plate may exemplarily include glass, plastic or another material transparent for a selected wavelength range. In addition, the optical waveguide plate may be plane-parallel (planar) at least in the regions of the visual fields of the optical channels of the multi-aperture imaging system.

In embodiments, the local distribution of the redirecting structures or microstructures is adjusted such that these are located in the zones outside the visual fields of the optical channels of the multi-aperture imaging system on the optical waveguide plate. The following arrangements are, for example, possible here. The local distribution of the redirecting structures or microstructures may exemplarily be characterized by a regular grating (such as, e.g., Cartesian, hexagonal and similar), an irregular distribution (such as, e.g., statistical distribution or other distribution for adjusting the area occupancy) or a combination thereof.

The material of the redirecting structures or microstructures is to match best, in its optical characteristics (transmission, index of refraction, etc.) that of the optical waveguide plate. It may exemplarily also consist of glass, plastic, polymer or photo resist.

In embodiments, different shape characteristics of the redirecting structures or microstructures are possible. Exemplarily, lens-like surface profiles (such as, e.g., microlenses with a radius of curvature of $R=1/c$ and conical value k), pyramid-like or conical structures (e.g. so as to achieve a special distribution of the illumination angles), rough surface areas (light-scattering regions), diffractive structures (such as, e.g., diffraction gratings, nanostructures) or mixtures thereof may be used for the redirecting structures or microstructures. When using lens-like surface profiles, a surface profile which describes the structural height z using a radial coordinate r from a central point, is given for example by the following equation:

$$z = \frac{cr^2}{1 + \sqrt{1-(1+k)c^2r^2}}$$

In embodiments, a local variation or lateral change of the parameters of the redirecting structures (microstructures) is of advantage. The local parameter variation may exemplarily be used for achieving a homogeneous object field illumination. When lens-like surface profiles (such as, e.g., microlenses) are used, adjusting the radius of curvature R and the conical value k for example allows adjusting the coupling-out efficiency in dependence on the position on the optical waveguide plate. Additionally, the local parameter variation may be realized by varying the size of the redirecting structures or microlenses (such as, e.g., diameter, height). Additionally, further smaller microlenses may exemplarily be integrated in smaller gaps of the visual fields of neighboring optical imaging channels (within the dead zones). A mixture of different sizes thereof or a different area filling may exemplarily be used here.

In embodiments, an area occupation or area occupancy of the redirecting structures or microstructures placed in the region (dead zone) around the visual fields of the optical imaging channels may vary over the area of the waveguide or optical waveguide plate. The variation of the area occupancy allows adjusting the amount of light coupled out of the optical waveguide in the direction of the object or object plane, in correspondence with a distance of a respective surface element of the optical waveguide from the laterally applied light sources. This results in an improvement in the illumination homogeneity on the extended object area (object plane). In the case of lens-like surface profiles (such as, e.g., microlenses), this exemplarily becomes possible by means of additional microlenses within the allowed region (i.e. in the dead zones outside the visual fields of the optical channels of the imaging system) or by leaving out certain areas in a controlled manner (vacancies).

In order to reflect the light guided in the waveguide or impinging beams with the least possible loss and thus achieve a higher illumination efficiency, the surface of the redirecting structures, like, for example, the microlenses, may be coated with a reflective layer (such as, e.g., metal, dielectric coating), as has been discussed with regard to FIG. 3.

In addition, eliminating reflections in the planar, object-side interface of the optical waveguide so as to prevent back-reflections to the individual visual fields of the imaging channels may be obtained by providing an anti-reflection layer on the side of the waveguide facing the object plane, as has already been described.

In embodiments, mirror-plating of smaller lateral face regions of the waveguide or optical waveguide plate where there are no abutting light source and no light is coupled in may be provided for so as to prevent light from exiting at these areas. Thus, a loss of light at the lateral face regions of the waveguide or optical waveguide plate may be minimized.

In embodiments, the redirecting structures or microstructures may be implemented to be adaptive (e.g. as liquid-crystal microlenses) so as to implement coupling-out efficiency to be variable over time.

Embodiments of the present invention provide a method for optical sampling of an object plane in visual fields, abutting or overlapping in the object plane, of a plurality of optical channels of a multi-channel imaging system. The method exemplarily comprises the following steps. Light is guided laterally in a waveguide arranged between the object plane and the multi-channel imaging system. The waveguide here comprises a plurality of redirecting structures which are arranged on a side of the waveguide facing the object plane and/or a side of the waveguide facing the multi-channel imaging system. In addition, the redirecting structures may be arranged in dead zones between the visual fields of the optical channels. Finally, the guided light is guided, by means of the redirecting structures, in the direction of the object plane so as to illuminate the object plane.

The embodiments described above only represent an illustration of principles of the present invention. It is obvious that modifications and variations of the arrangements and specifics described here will be clear for other persons skilled in the art. Therefore, the invention is intended to be limited only by the scope of the following claims, but not the specific details having been presented here with regard to the description and the discussion of embodiments.

Embodiments of the present invention provide an optics arrangement comprising an extremely thin illumination module for obtaining incident light illumination for a multi-aperture imaging system or multi-channel imaging system of a small operating distance in the range of some millimeters.

In contrast to some known techniques where there is a limitation to transmitted light and which are thus limited to applications of image recording of (semi-)transparent or self-luminous objects, observing non-transparent and non-luminous objects becomes possible in the case of incident light illumination when using the inventive optics arrangement.

Furthermore, embodiments provide a concept in which the redirecting structures or microstructures exhibit location-dependent light coupling-out efficiency. This is of advantage in that homogeneous object illumination may be ensured by this.

The effect of the illumination device or illumination module in a micro-optical imaging system or the inventive optics arrangement is that the object region can be illuminated (to the most homogeneous degree possible) The advantage of the inventive optics arrangement is, above all, that a large object area can be illuminated homogeneously, without thereby impeding the multi-aperture imaging system or multi-channel imaging system (in particular with regard to compactness and short structural length).

The present invention may exemplarily be used for microscopic image recording, inspecting non-transparent and non-luminous object surfaces (such as, e.g., surface profiles of a finger, technical surfaces, structured silicon wafers), document recordings, fluorescence image recording (similar to epifluorescence arrangements) or multi-aperture cameras in extremely close-up recordings with an object distance of some millimeters.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An optics arrangement comprising:
    a multi-channel imaging system for optical sampling of an object plane comprising visual fields, abutting or overlapping in the object plane, of a plurality of optical channels of the multi-channel imaging system, wherein the multi-channel imaging system is configured to optically image the object plane onto an image plane via the plurality of optical channels; and
    a waveguide arranged between the object plane and the multi-channel imaging system for guiding light laterally in the waveguide,
    wherein the waveguide comprises a plurality of redirecting structures arranged on a side of the waveguide facing the object plane and/or on a side of the waveguide facing the multi-channel imaging system, wherein the redirecting structures are arranged in dead zones between the visual fields of the optical channels, and wherein the redirecting structures are configured to deflect the guided light in the direction of the object plane such that the object plane is illuminated.

2. The optics arrangement in accordance with claim 1, wherein the multi-channel imaging system comprises, for each optical channel, optics comprising a field aperture which determines the visual field of the respective channel.

3. The optics arrangement in accordance with claim 1, wherein the multi-channel imaging system is configured to image the object plane onto an image plane via the plurality of optical channels such that the result in the image plane is a fill factor between 90 and 100%.

4. The optics arrangement in accordance with claim 1, wherein the redirecting structures are implemented on the side of the waveguide facing the multi-channel imaging system so as to scatter or reflect the guided light in the direction of the object plane.

5. The optics arrangement in accordance with claim 1, wherein the redirecting structures on the side of the waveguide facing the multi-channel imaging system comprise a plurality of microlenses which are curved in the direction of the multi-channel imaging system and are provided with a reflective layer.

6. The optics arrangement in accordance with claim 1, wherein the redirecting structures on the side of the waveguide facing the multi-channel imaging system are arranged at grating positions of a grating, the multi-channel imaging system comprising, for each channel, optics, optical axes of the channels being arranged at intermediate grating positions of the grating.

7. The optics arrangement in accordance with claim 6, wherein the grating is a regular Cartesian or hexagonal grating.

8. The optics arrangement in accordance with claim 1, wherein, between neighboring redirecting structures, a parameter thereof changes laterally, the parameter describing a characteristic of a surface profile.

9. The optics arrangement in accordance with claim 1, wherein an area occupancy of the redirecting structures on the waveguide changes laterally.

10. The optics arrangement in accordance with claim 1, wherein a density at which optical axes of the optical channels of the multi-channel imaging system are distributed laterally is constant.

11. The optics arrangement in accordance with claim 1, wherein the visual fields of all the channels are equal.

12. The optics arrangement in accordance with claim 1, wherein the redirecting structures on the side of the waveguide facing the multi-channel imaging system comprise a plurality of adaptive microlenses, the adaptive microlenses being configured to vary over time coupling-out efficiency of the light guided in the waveguide in the direction of the object plane.

13. The optics arrangement in accordance with claim 1, further comprising one or several light sources arranged laterally next to the waveguide, the one or several light sources being configured to coupling light into the waveguide laterally.

14. The optics arrangement in accordance with claim 1, wherein the channels of the multi-channel imaging system are distributed in two dimensions and the waveguide is implemented as an optical waveguide plate.

15. The optics arrangement in accordance with claim 14, wherein the optical waveguide plate is shaped to be rectangular, the optics arrangement additionally comprising one or several light sources arranged laterally next to the rectangularly-shaped optical waveguide plate, the one or several light sources being configured to couple light from a longer side of the rectangularly-shaped optical waveguide plate into same.

16. The optics arrangement in accordance with claim 1, wherein the waveguide comprises an anti-reflection layer arranged on the side of the waveguide facing the object plane so that back-reflections to the visual fields of the optical channels are prevented.

17. The optics arrangement in accordance with claim 1, additionally comprising one or several light sources and associated optical filters, the one or several light sources being configured to provide light of a spectral input bandwidth for coupling-in into the waveguide, the optical filters being configured to modify the spectral input bandwidth of the light provided by the one or several light sources, the optics arrangement being configured to acquire the light deflected in the direction of the object plane at a modified spectral output bandwidth for illuminating the object plane.

18. The optics arrangement in accordance with claim 1, additionally comprising one or several light sources, the one or several light sources being configured to provide light of a spectral input bandwidth for coupling-in into the waveguide, the waveguide being configured to modify the spectral input bandwidth of the light provided by the one or several light sources, the optics arrangement being configured to acquire the light deflected in the direction of the object plane at a modified spectral output bandwidth for illuminating the object plane.

19. The optics arrangement in accordance with claim 17, wherein the modified spectral output bandwidth is smaller than the spectral input bandwidth.

20. The optics arrangement in accordance with claim 1, wherein a shape of the redirecting structures or the number of redirecting structures per area of dead zones where the redirecting structures are arranged changes laterally on the waveguide, the optics arrangement being configured to acquire in the object plane a predetermined spatial distribution of the light deflected in the direction of the object plane.

21. The optics arrangement in accordance with claim 1, wherein the waveguide comprises a plurality of apertures associated to the redirecting structures arranged in the dead zones, the apertures each comprising an aperture opening configured to vary the transmission of the light deflected in the direction of the object plane so as to adjust an angular distribution of the light deflected in the direction of the object plane.

22. The optics arrangement in accordance with claim 1, wherein a structural implementation of the redirecting structures on the waveguide changes laterally and/or in the direction of the object plane, the redirecting structures being configured to acquire a predetermined angular distribution of the light deflected in the direction of the object plane.

23. A method for optical sampling of an object plane comprising visual fields, abutting or overlapping in the object plane, of a plurality of optical channels of a multi-channel imaging system, wherein the multi-channel imaging system is configured to optically image the object plane onto an image plane via the plurality of optical channels, comprising:

laterally guiding light in a waveguide arranged between the object plane and the multi-channel imaging system, wherein the waveguide comprises a plurality of redirecting structures arranged on a side of the waveguide facing the object plane and/or on a side of the waveguide facing the multi-channel imaging system, wherein the redirecting structures are arranged in dead zones between the visual fields of the optical channels, and deflecting the guided light in the direction of the object plane using the redirecting structures such that the object plane is illuminated.

* * * * *

UNITED STATES PATENT AND TRADEMARK OFFICE
CERTIFICATE OF CORRECTION

PATENT NO. : 8,922,866 B2
APPLICATION NO. : 13/969457
DATED : December 30, 2014
INVENTOR(S) : Andreas Brueckner, René Berlich and Andreas Braeuer It is certified that error appears in the above-identified patent and that said Letters Patent is hereby corrected as shown below:

On the Title page item (73) Assignee: "Rene Berlich" should read --René Berlich--

Signed and Sealed this
Second Day of August, 2016

Michelle K. Lee
*Director of the United States Patent and Trademark Office*